United States Patent
Ake

(10) Patent No.: US 7,643,016 B2
(45) Date of Patent: Jan. 5, 2010

(54) COORDINATE INPUT PEN AND COORDINATE INPUT APPARATUS HAVING THE SAME

(75) Inventor: Yasunori Ake, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 620 days.

(21) Appl. No.: 11/425,189

(22) Filed: Jun. 20, 2006

(65) Prior Publication Data

US 2006/0290682 A1    Dec. 28, 2006

(30) Foreign Application Priority Data

Jun. 24, 2005   (JP)  ............................... 2005-185506

(51) Int. Cl.
*G06F 3/033* (2006.01)
*G06F 3/041* (2006.01)
*G06F 3/043* (2006.01)

(52) U.S. Cl. .................... 345/179; 345/173; 178/18.01; 178/18.04

(58) Field of Classification Search ................. 345/158, 345/173, 179; 178/19.01, 19.02
See application file for complete search history.

(56) References Cited

U.S. PATENT DOCUMENTS

| 4,980,518 | A | * | 12/1990 | Kobayashi et al. | ....... 178/18.04 |
| 6,232,962 | B1 | * | 5/2001 | Davis et al. | .................. 345/177 |
| 7,268,774 | B2 | * | 9/2007 | Pittel et al. | ................... 345/179 |
| 7,342,350 | B2 | * | 3/2008 | Toda | .......................... 310/334 |
| 2001/0050677 | A1 | * | 12/2001 | Tosaya | ........................ 345/179 |

FOREIGN PATENT DOCUMENTS

| JP | 07-175580 A | 7/1995 |
| JP | 8-44487 A | 2/1996 |
| JP | 9-305306 A | 11/1997 |
| JP | 11-39096 A | 2/1999 |
| JP | 2002-333950 | 11/2002 |
| JP | 2003-15813 A | 1/2003 |

* cited by examiner

*Primary Examiner*—Sumati Lefkowitz
*Assistant Examiner*—Charles Hicks
(74) *Attorney, Agent, or Firm*—Keating & Bennett, LLP

(57) ABSTRACT

The coordinate input pen according to the present invention is a coordinate input pen for specifying a current position of the coordinate input pen by emitting an ultrasonic wave, including: an ultrasonic wave oscillating section for oscillating the ultrasonic wave for specifying coordinates of the current position; an ultrasonic wave emitting outlet for emitting, to an outside, the ultrasonic wave oscillated by the ultrasonic wave oscillating section; and an ultrasonic wave propagation route which has a fixed length and extends from the ultrasonic wave oscillating section to the ultrasonic wave emitting outlet and is used to propagate the ultrasonic wave to the ultrasonic wave emitting outlet. As a result, it is possible to maintain the output level of the ultrasonic wave oscillated by the ultrasonic wave oscillating section constant regardless of how large a stroke pressure applied on the coordinate input pen is.

14 Claims, 6 Drawing Sheets

COORDINATE INPUT PEN AND COORDINATE INPUT APPARATUS HAVING THE SAME

This non-provisional application claims priority under 35 U.S.C. § 119(a) on patent application Ser. No. 185506/2005 filed in Japan on Jun. 24, 2005, the entire contents of which are hereby incorporated by reference.

FIELD OF THE INVENTION

The present invention relates to a coordinate input pen and a coordinate input apparatus, and more particularly relates to a coordinate input apparatus which causes an ultrasonic wave oscillating section to oscillate ultrasonic waves and detects, based on the ultrasonic waves, coordinates specified by the coordinate input pen.

BACKGROUND OF THE INVENTION

As a coordinate input apparatus for use in specifying a position on a screen of a display device or displaying lines such as characters and figures on the display device, various pointing devices such as mouse-type devices, pen-type devices, and track balls have been known.

Recently, pen-type devices (coordinate input pen) using ultrasonic waves have been proposed as pointing devices and have attracted attention. The coordinate input pen based on the ultrasonic wave method oscillates an ultrasonic wave by the coordinate input pen and calculates the position of the coordinate input pen on the basis of a propagation period from a time when an ultrasonic wave is oscillated to a time when a receiver fixed on a pad member (input face) such as a paper receives the ultrasonic wave, thereby inputting the input position of the coordinate input pen and manuscript writing in a computer. The foregoing technique allows manuscript input with ease. Further, this ultrasonic wave method allows input of exact input position of a pen and exact lines of the pen without providing a special board or a paper.

In a coordinate input apparatus adopting the foregoing coordinate input pen using ultrasonic waves, in order to accurately detect an input position of the coordinate input pen, it is necessary to maintain an output level of an ultrasonic wave from the coordinate input pen constant regardless of changes in stroke pressure applied on the coordinate input pen when an input instruction is given to the input face by the coordinate input pen. Japanese Unexamined Patent Publication No. 175580/1995 (Tokukaihei 7-175580; published on Jul. 14, 1995) discloses an example structure wherein an output level of an ultrasonic wave as emitted from the coordinate input pen can be maintained constant.

In the technique disclosed in Japanese Unexamined Patent Publication No. 175580/1995, a pressure sensor provided in the input pen detects a pressure (stroke pressure) applied on the input pen in a direction of the central axis of the frame of the input pen, and an operation control circuit controls a driving voltage control circuit to adjust a driving voltage for driving an oscillating section which oscillates an ultrasonic wave.

To be specific, in the coordinate input pen based on the ultrasonic wave method disclosed in Japanese Unexamined Patent Publication No. 175580/1995, in a case where the driving voltage for driving the oscillating section is constant, when a stroke pressure applied on the input pen is high, an output level of the ultrasonic wave increases. Therefore, the operation control circuit performs control so that the driving voltage drops as the stroke pressure increases.

For example, when the stroke pressure is low, the operation control circuit performs control so that the driving voltage increases. By driving the oscillating section with the increased driving voltage, it is possible to obtain a desired output level of an ultrasonic wave. Further, when the stroke pressure is high, the operation control circuit performs control so that the driving voltage drops. By driving the oscillating section with the dropped driving voltage, it is possible to obtain a desired output level of an ultrasonic wave.

Namely, in the technique disclosed in Japanese Unexamined Patent Publication No. 175580/1995, the driving voltage for driving the oscillating section is changed according to a change in the stroke pressure, so that the output level of the ultrasonic wave oscillated by the oscillating section is constant.

The foregoing conventional structure has the following problem. That is, to maintain the output level of the ultrasonic wave oscillated by the oscillating section constant, it is necessary to adjust a driving voltage for driving the oscillating section driving circuit according to changes in the stroke pressure applied on the coordinate input pen, which forces the driving circuit to have a complex structure.

SUMMARY OF THE INVENTION

An object of the present invention is to provide a coordinate input pen and a coordinate input apparatus adopting the coordinate input pen, which realize an accurate detection of an input position regardless of variations in stroke pressure, without requiring a complex structure of a driving circuit of the coordinate input pen.

In order to achieve the object, a coordinate input pen according to the present invention is a coordinate input pen for specifying a current position of the coordinate input pen by oscillating an ultrasonic wave and includes: an ultrasonic wave oscillating section for oscillating an ultrasonic wave for specifying the current position; an ultrasonic wave emitting orifice for emitting, to an outside, the ultrasonic wave oscillated by the ultrasonic wave oscillating section; and an ultrasonic wave propagation route which has a fixed length and extends from the ultrasonic wave oscillating section to the ultrasonic wave emitting outlet and is used to propagate the ultrasonic wave to the ultrasonic wave emitting outlet.

It is preferable to arrange the coordinate input pen so that the ultrasonic wave oscillating section is provided so as to move interlocking with the ultrasonic wave emitting orifice via the ultrasonic wave propagation route.

With the arrangement, the ultrasonic wave propagation route is provided such that the distance between the ultrasonic wave oscillating section and the ultrasonic wave emitting outlet can be maintained constant. As a result, the ultrasonic wave oscillated by the ultrasonic wave oscillating section does not change its output level while being propagated to the ultrasonic wave emitting outlet.

Namely, in the case where a user specifies any coordinates by use of the coordinate input pen, when the user presses the coordinate input pen, i.e., when the user applies a stroke pressure on the coordinate input pen, it is possible to maintain the distance between the ultrasonic wave oscillating section and the ultrasonic wave emitting outlet constant, regardless of how high the stroke pressure applied on the coordinate input pen is. As a result, it is possible for the ultrasonic wave emitting outlet to emit an ultrasonic wave of a constant output level, so that the output level of the ultrasonic wave oscillated by the coordinate input pen can be maintained constant.

In order to achieve the object, a coordinate input apparatus according to the present invention includes: a coordinate input pen; a reception section for receiving an ultrasonic wave emitted from the coordinate input pen; and a calculation section for calculating coordinates of the coordinate input pen based on the ultrasonic wave received by the reception section.

With the arrangement, it is possible to maintain the output level of the ultrasonic wave oscillated by the coordinate input pen constant regardless of how high the stroke pressure applied on the coordinate input pen is when coordinates are inputted by use of the coordinate input pen.

Namely, the reception section can receive the ultrasonic wave of a constant output level and the calculation section can calculate coordinates of the coordinate input pen based on the ultrasonic wave which is received by the reception section and which has a constant output level. Therefore, it is possible to accurately detect (calculate) the position specified by the user by use of the coordinate input pen. As a result, it is possible to provide the coordinate input apparatus, which can accurately detect coordinates.

It is preferable to arrange the coordinate input pen so that a pen point section which comes in touch with the outside when inputting coordinates is provided so as to be movable in forward and backward directions interlocking with the ultrasonic wave emitting orifice.

With the arrangement, the pen point section is provided so as to be movable in forward and backward directions interlocking with the ultrasonic wave emitting orifice, so that the distance between the pen point section and the ultrasonic wave emitting orifice can be maintained constant regardless of how high the stroke pressure applied on the coordinate input pen is.

As a result, when the user specifies any coordinates by use of the coordinate input pen, the distance between the ultrasonic wave emitting outlet and the reception section for receiving the ultrasonic wave does not change with changes in stroke pressure applied on the coordinate input pen. Therefore, it is possible for the reception section to receive the ultrasonic wave which is oscillated by the coordinate input pen and whose output level is constant, regardless of how high the stroke pressure applied on the coordinate input pen is.

For a fuller understanding of the nature and advantages of the invention, reference should be made to the ensuing detailed description taken in conjunction with the accompanying drawings.

DESCRIPTION OF THE EMBODIMENTS

With reference to FIGS. 1 to 6, the following explains an embodiment of the present invention.

Figure 2:
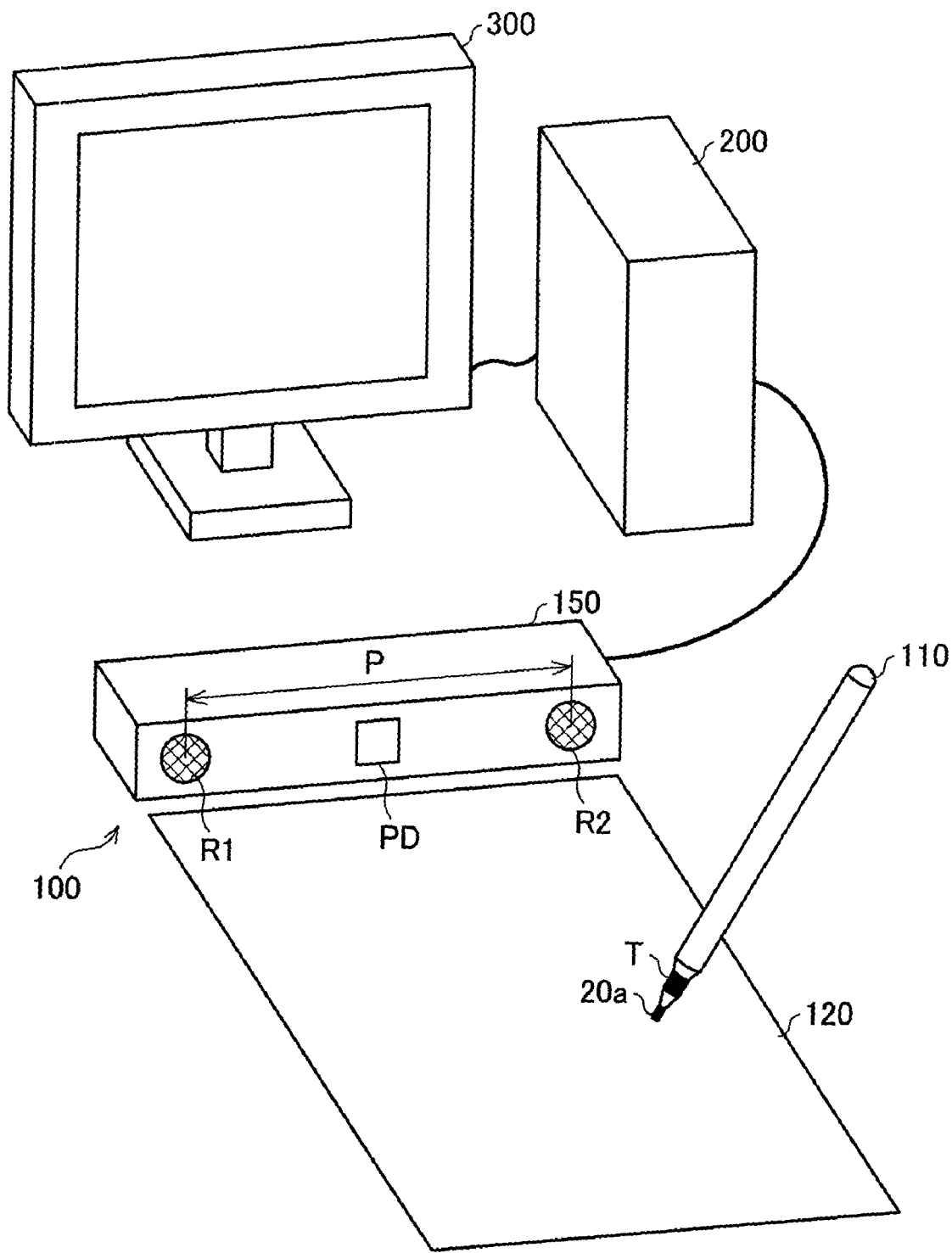
FIG. 2 is an oblique view illustrating a structure of a coordinate input apparatus using the coordinate input pen according to the present invention.

FIG. 2 is an oblique view schematically illustrating a structure of a coordinate input apparatus according to the embodiment of the present invention. As shown in FIG. 2, a coordinate input apparatus 100 includes a pen-type device (coordinate input pen) 110, an input face 120 (outside), and a reception unit (reception section) 150. Note that, the reception unit 150 is connected with a computer main body 200 and the computer main body 200 is connected with a monitor 300.

The coordinate input pen 110 is a pointing device based on an ultrasonic wave method for specifying an input position and coordinates. When a user causes a pen point section 20a of the coordinate input pen 110 to touch the input face 120, the coordinate input pen 110 based on the ultrasonic wave method oscillates an ultrasonic wave and an infrared ray. Note that, the detailed structure of the coordinate input pen 110 is mentioned later.

The reception unit 150 receives the ultrasonic wave and the infrared ray oscillated by the coordinate input pen 110, calculates the specified position (coordinate values) of the coordinate input pen 110 on the input face 120 on the basis of the ultrasonic wave and the infrared ray, and inputs the calculated data to the computer main body 200.

Note that, the material of the input face 120 is not limited as long as the input face 120 is a pad member touched by the pen point section 20a of the coordinate input pen 110 and has a smooth surface. The input face 120 can be made of various materials such as papers, planks, metals, and industrial chemicals. Further, it is possible to use the coordinate input pen 110 on a desk without using the pad member.

The monitor 300 is a device for displaying an image based on data processed by the computer main body 200. In the present embodiment, a liquid crystal display is used as the monitor 300. However, the monitor 300 is not limited to the liquid crystal display and may be a plasma display, a CRT (cathode ray tube) display, an organic EL (Electro Luminescence) display, and an inorganic EL display for example.

Based on the coordinate values acquired from the reception unit 150, the computer main body 200 performs a drawing process for drawing a cursor and the like to be displayed on the monitor 300. Namely, when the user draws a line on the input face 120 by use of the coordinate input pen 110, the computer main body 200 performs the drawing process for moving, along the line, the cursor to be displayed on the monitor 300. Further, the computer main body 200 performs a process for drawing a figure corresponding to the line on a screen of the monitor 300.

Then, by using the coordinate input apparatus 100, information indicative of an input position via which an input operation is carried out by causing the pen point section 20a of the coordinate input pen 110 to touch the input face 120 is inputted to the computer main body 200. As a result, the input position of the coordinate input pen 110 is displayed on the monitor 300.

Note that, ultrasonic wave receivers R1 and R2, which are provided in the reception unit 150 and which receive an ultrasonic wave are respectively disposed near ends of the reception unit 150. Further, an infrared ray receiver PD for receiving an infrared ray is disposed near the center between the ultrasonic wave receivers R1 and R2. Further, the speed of an ultrasonic wave oscillated by an ultrasonic wave oscillator T and a distance P between the ultrasonic wave receivers R1 and R2 are predetermined.

Figure 3:
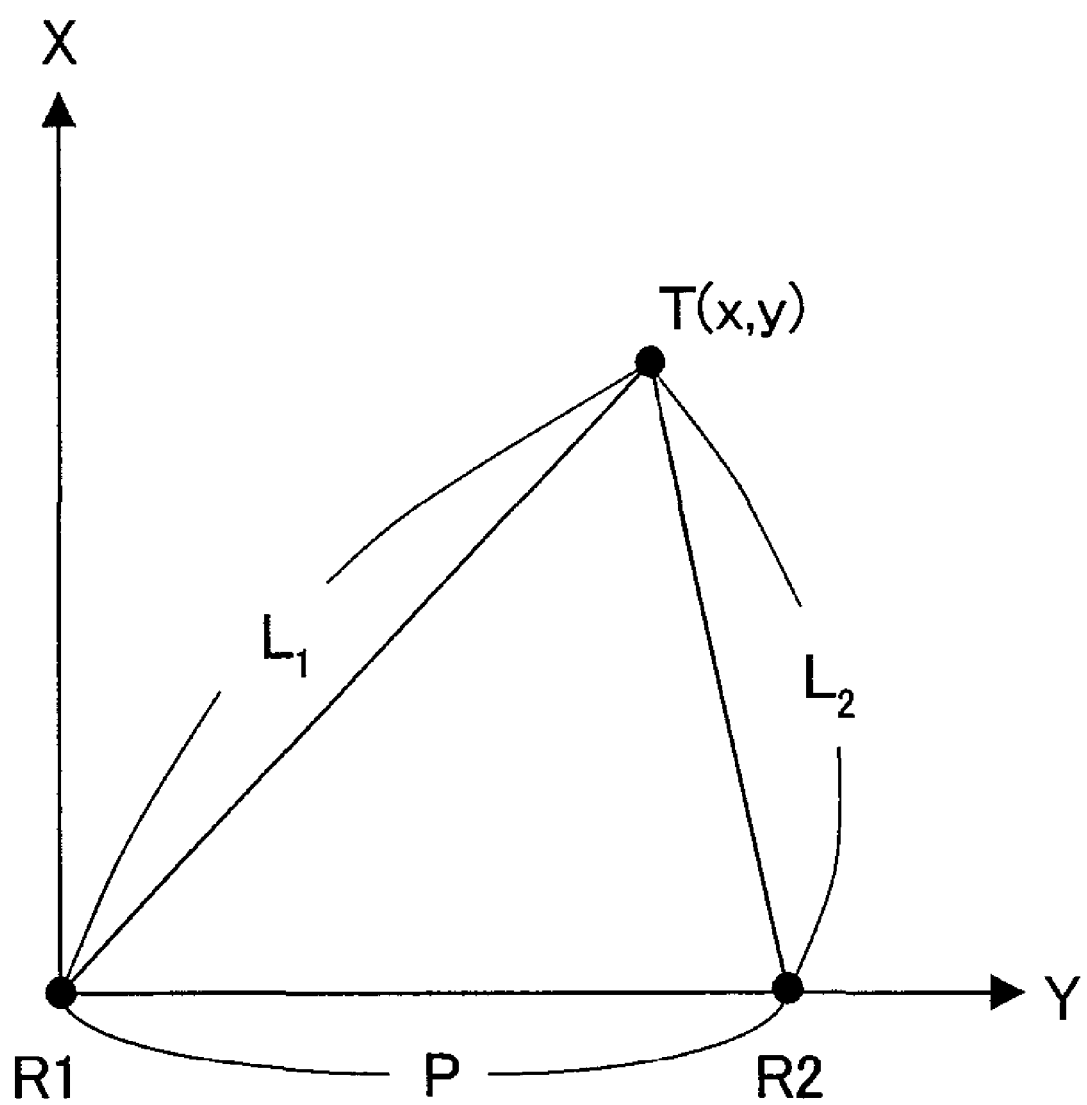
FIG. 3 illustrates the position of the coordinate input pen according to the present invention on a coordinate plane.

Here, with reference to FIGS. 2 and 3, the following explains an example of a method for detecting the position of the coordinate input pen 110 in the coordinate input apparatus 100.

In the arrangement, when the user causes the pen point section 20a of the coordinate input pen 110 to touch the input face 120, the coordinate input pen 110 oscillates an infrared ray and an ultrasonic wave at once. The reception unit 150 receives the oscillated infrared ray and the ultrasonic wave. At that time, the infrared ray having light speed reaches the reception unit 150 faster than the ultrasonic wave having sound speed because light speed is faster than sound speed. As a result, there is a difference between the time for the infrared ray to reach the reception unit 150 and the time for the ultrasonic wave to reach the reception unit 150. It is therefore possible to calculate the distance between the coordinate input pen 110 and the reception unit 150 based on the time difference.

Here, the following explains a method for calculating the coordinate values of the coordinate input pen 110 by use of the ultrasonic wave emitted from the coordinate input pen 110. The propagation period from a time when the infrared ray receiver PD of the reception unit 150 receives the infrared ray to a time when the ultrasonic wave receiver R1 of the reception unit 150 receives the ultrasonic wave is regarded as t1 and the propagation period from a time when the infrared ray receiver PD of the reception unit 150 receives the infrared ray to a time when the ultrasonic wave receiver R2 of the reception unit 150 receives the ultrasonic wave is regarded as t2. The propagation periods t1 and t2 are measured by the reception unit 150. The propagation periods t1 and t2 are multiplied by the speed of the ultrasonic wave, so that it is possible to calculate a distance L1 between the ultrasonic wave oscillator T and the ultrasonic wave receiver R1 and a distance L2 between the ultrasonic wave oscillator T and the ultrasonic wave receiver R2.

Here, FIG. 3 illustrates a positional relation among the ultrasonic wave receivers R1, R2, and the ultrasonic wave oscillator T on a coordinate plane whose origin is the position of the ultrasonic wave receiver R1. As illustrated in FIG. 3, if a triangle whose apices are R1, R2, and T is assumed and the coordinate values of the ultrasonic wave oscillator T is regarded as (x, y), the following equations are given based on triangulation.

$$x^2 + y^2 = L1^2 \quad (1)$$

$$(x-P)^2 + y^2 = L2^2 \quad (2)$$

Further, if the equations (1) and (2) are transformed, the following equations are given.

$$x = (P^2 + L1^2 - L2^2)/2P \quad (3)$$

$$y = (L1^2 - x^2)^{1/2} \quad (4)$$

Therefore, by putting (i) the distances L1 and L2 which are obtained on the basis of the propagation periods t1 and t2 calculated in the reception unit 150 and (ii) the predetermined P (the distance between R1 and R2) in the equations (3) and (4), it is possible to calculate the coordinate values (x, y) of the ultrasonic wave oscillator T.

Because the ultrasonic wave oscillator T is provided in the coordinate input pen 110, the coordinate values (x, y) can be regarded as the coordinate values of the coordinate input pen 110. As a result, it is possible to detect the input position of the coordinate input pen 110 on the input face 120.

Figure 4:
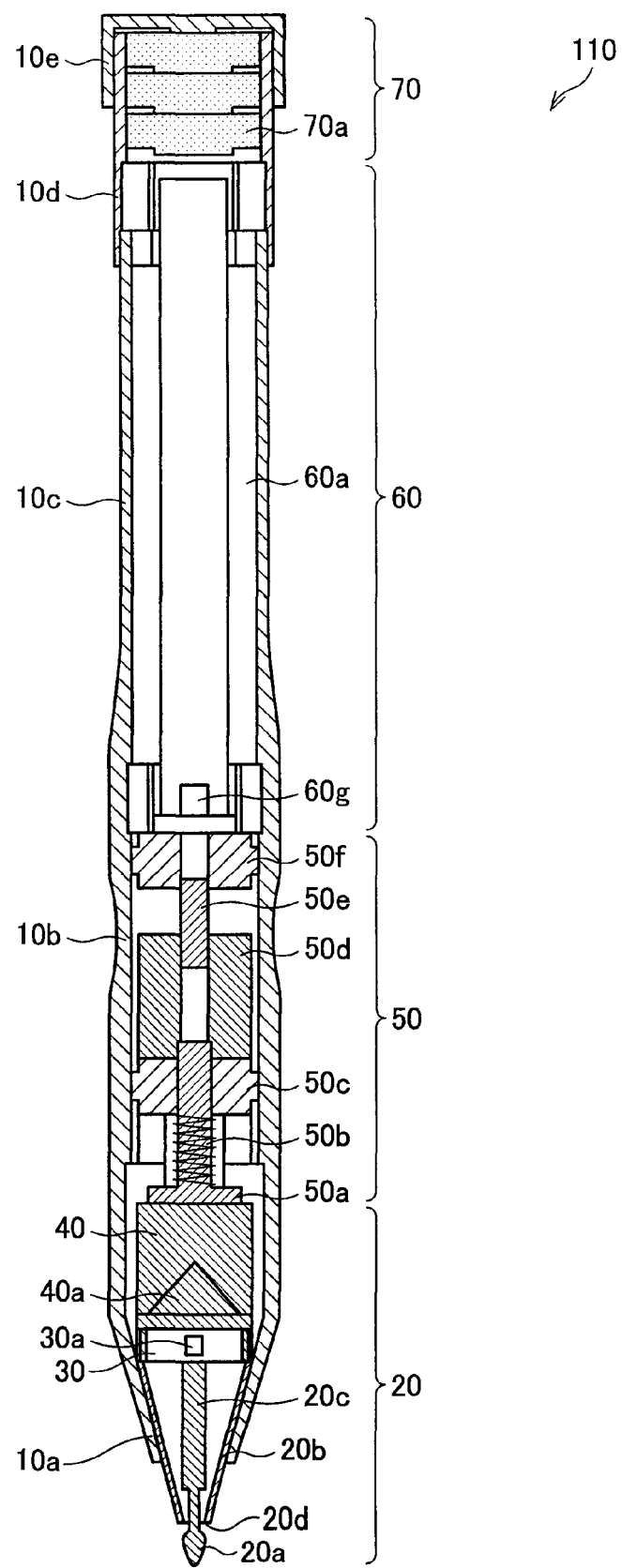
FIG. 4 is a cross sectional view illustrating an entire structure of the coordinate input pen according to the present invention.

Here, with reference to FIG. 4, the following explains the detailed structure of the coordinate input pen 110 according to the present embodiment.

The coordinate input pen 110 includes a pen end section 20, a stroke pressure detection mechanism 50, a driving circuit section 60, and a power section 70 in a pen frame 10.

The pen frame 10 is seen as the outlook of the coordinate input pen 110 and includes a pen point frame 10a, a pen frame 10b, a pen frame 10c, a pen frame 10d, and a pen frame 10e, which are connected in this order.

The pen point frame 10a has a substantially conical shape and has a hollow and penetrated space therein. Each of the pen frames 10b, 10c, and 10d has a cylindrical shape and has a hollow and penetrated space therein. The pen frame 10e has a cylindrical shape and has a hollow space therein, but one side of the space is sealed.

Note that, the pen point frame 10a is constituted of three frames in terms of mechanism, and each frame is fixed with an adjacent one. The three frames are respectively made of polycarbonate resin, infrared-ray-transmission resin, and polycarbonate resin. Further, the pen frame 10b, the pen frame 10c, the pen frame 10d, and the pen frame 10e are made of polycarbonate resin. Note that, the material of the pen frame 10 is not limited to the above resin as long as the material is strong enough not to be distorted when the coordinate input pen 110 is used.

The pen end section 20 includes an ultrasonic wave oscillating element and oscillates an ultrasonic wave to an outside. The pen end section 20 is included in the pen frame 10 and constituted of (i) a pen core 20c including a pen point section 20a which touches the input face 120 when the coordinate input pen 110 inputs the coordinate values, (ii) an ultrasonic wave propagation route forming section 20b for forming a propagation route of an oscillated ultrasonic wave, (iii) an infrared ray emitting section 30 for emitting an infrared ray, and (iv) an ultrasonic wave oscillating section (ultrasonic wave oscillating element) 40 for oscillating an ultrasonic wave. Further, the pen core 20c, the ultrasonic wave propagation route forming section 20b, the infrared ray emitting section 30, and the ultrasonic wave oscillating section 40 are fixed with each other. Note that, the pen end section 20 will be detailed later.

The stroke pressure detection mechanism 50 detects a stroke pressure applied on the coordinate input pen 110 when the user specifies any coordinates by use of the coordinate input pen 110.

The driving circuit section 60 is a circuit for driving (i) the infrared ray emitting section 30 (to be specific, an infrared ray LED chip 30a) for emitting an infrared ray and (ii) the ultrasonic wave oscillating section 40 (to be specific, an ultrasonic wave element 40a) for oscillating an ultrasonic wave. Note that, the stroke pressure detection mechanism 50 and the driving circuit section 60 will be detailed later.

The power section 70 is used to supply power for driving the driving circuit section 60 of the coordinate input pen 110. In the present embodiment, three button batteries 70a are provided and supply power to the driving circuit section 60.

The pen end section 20, the stroke pressure detection mechanism 50, the driving circuit section 60, and the power section 70 are disposed in the pen frame 10 in this order so that the pen end section 20 is the nearest to the pen point side of the coordinate input pen 110. Further, the pen end section 20 is disposed in the pen frame 10 so that the pen end section 20 is separated from the pen frame 10 and is slidable in the lengthwise direction of the pen frame 10. The stroke pressure detection mechanism 50 is arranged such that the later mentioned support members 50c and 50f are fixed to the inner wall of the pen frame 10; whereas other members are slidable in the pen frame 10.

Further, the pen end section 20 is fixed with each member of the stroke pressure detection mechanism 50 except for the support members 50c and 50f. Further, the driving circuit section 60 and the power section 70 are fixed and contained in the pen frame 10 so that the driving circuit section 60 and the power section 70 are electrically connected with each other.

Figure 1:
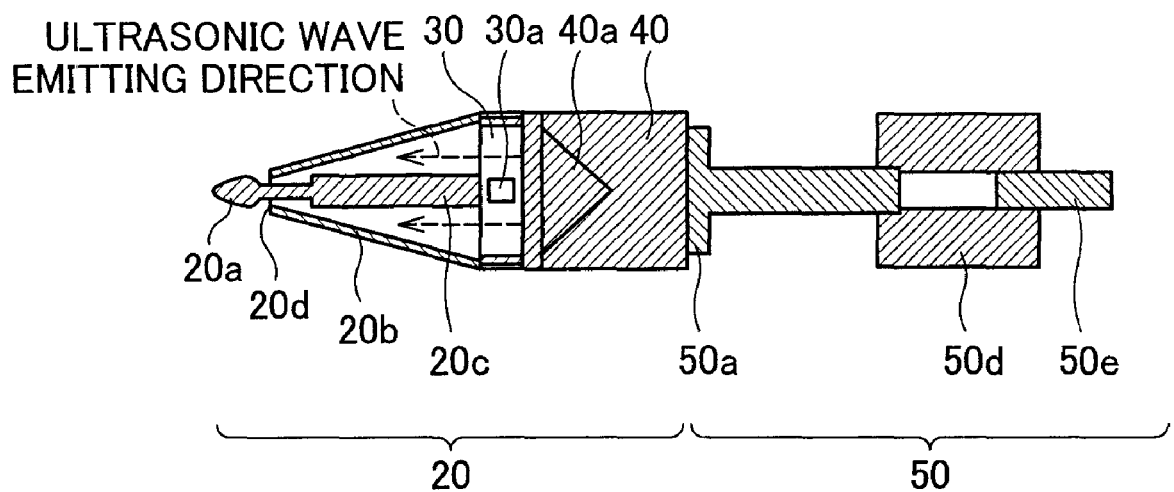
FIG. 1 is a cross sectional view illustrating essential parts of the inside of a coordinate input pen according to an embodiment of the present invention.

Here, with reference to FIG. 1, the following explains the structure of the pen end section 20 disposed in the pen frame 10.

The pen end section 20 is a section with which the user specifies any coordinates while using the coordinate input pen 110 and is a section on which a stroke pressure is applied when the user specifies the coordinates. As described above, the pen end section 20 is constituted of the pen core 20c, the ultrasonic wave propagation route forming section 20b, the infrared ray emitting section 30, and the ultrasonic wave oscillating section 40.

The pen core 20c includes the pen point section 20a which touches the input face 120 when the coordinates of the coordinate input pen 110 are specified. The pen core 20c has a cylindrical shape. The pen point section 20a, which is a point section for touching the input face 120, has its end narrowed so as to specify the coordinates of the coordinate input pen 110. Note that, the structures of the pen core 20c and the pen point section 20a are not limited to them as long as they can touch the input face 120 and specify the coordinates of the coordinate input pen 110.

The pen core 20c is disposed in the pen frame 10 so that the central axis of the pen frame 10 in a lengthwise direction is identical with the central axis of the pen core 20c in a lengthwise direction. Note that, the pen core 20c may be fixed with the ultrasonic wave oscillating section 40 or may be fixed with the ultrasonic wave propagation route forming section 20b.

Further, an example of the materials of the pen core 20c and the pen point section 20a is DURACON, but not limited to this as long as the materials are not distorted when a stroke pressure is applied on the pen point section 20a.

The ultrasonic wave propagation route forming section 20b is a member for forming a propagation route used to propagate an oscillated ultrasonic wave. The ultrasonic wave propagation route forming section 20b has substantially a conical shape and has a hollow and penetrated space therein. The ultrasonic wave propagation route forming section 20b is disposed in the pen frame 10 so that the top (narrowed section) of the ultrasonic wave propagation route forming section 20b is disposed at the pen point side of the coordinate input pen 110.

The ultrasonic wave propagation route forming section 20b is provided with an opening for emitting an ultrasonic wave to the outside (the opening is referred to as an "ultrasonic wave emitting outlet 20d" hereinafter). The ultrasonic wave emitting outlet 20d is broader in diameter than the pen core 20c and large enough to emit a sufficient ultrasonic wave.

As described above, the ultrasonic wave propagation route forming section 20b has a hollow structure which is narrowed from the ultrasonic wave element 40a to the ultrasonic wave emitting outlet 20d. As such, an ultrasonic wave oscillated by the ultrasonic wave element 40a is not blocked till the ultrasonic wave emitting outlet 20d. Therefore, it is possible to effectively emit an ultrasonic wave from the ultrasonic wave emitting outlet 20d in 360-degree directions.

The ultrasonic wave element 40a is provided with the ultrasonic wave propagation route forming section 20b and accordingly an ultrasonic wave oscillated by the ultrasonic wave element 40a is propagated via the ultrasonic wave propagation route forming section 20b in a direction of the ultrasonic wave emitting outlet 20d.

With the arrangement, the ultrasonic wave emitting outlet 20d is provided so as to move in relation to the ultrasonic wave element 40a (ultrasonic wave emitting section) via the ultrasonic wave propagation route forming section 20b. It is therefore possible to maintain the distance between the ultrasonic wave emitting outlet 20d and the ultrasonic wave element 40a constant, regardless of the stroke pressure applied on the coordinate input pen 110.

Note that, an example of the material of the ultrasonic wave propagation route forming section 20b is polycarbonate resin, but not limited to this.

The infrared ray emitting section 30 emits an infrared ray necessary for detecting the position on the input face 120 which position is specified by the coordinate input pen 110. The infrared ray emitting section 30 has a cylindrical shape and disposes and fixes, on its surface, infrared ray LED chips 30a as many as three for example. Further, the infrared ray emitting section 30 is disposed in the pen frame 10 so as to be slidable in a lengthwise direction of the pen frame 10.

The infrared ray emitting section 30 has a cylindrical shape and has a hollow and penetrated structure between the later-mentioned ultrasonic wave oscillating section 40 and the ultrasonic wave propagation route forming section 20b. The infrared ray emitting section 30 is driven by a later-mentioned infrared ray LED driving section 60h, thereby oscillating a synchronization signal of an infrared ray. The infrared ray oscillated by the infrared ray emitting section 30 penetrates the pen frame 10 and is emitted from the side of the coordinate input pen 110 in 360-degree directions. Note that, the synchronization signal (not shown) is a signal whose pulse rises with timing when the ultrasonic wave is oscillated.

As described above, the infrared ray emitting section 30 has a hollow structure, so that the ultrasonic wave oscillated by the ultrasonic wave oscillating section 40 passes through the inside of the infrared ray emitting section 30 without being blocked by the infrared ray emitting section 30 and is propagated to the ultrasonic wave propagation route forming section 20b. It is therefore possible to maintain the output level of the ultrasonic wave oscillated by the ultrasonic wave oscillating section 40 constant until the ultrasonic wave reaches the ultrasonic wave propagation route forming section 20b.

Next, the ultrasonic wave oscillating section 40 oscillates an ultrasonic wave necessary for detecting the position on the input face 120 which position is specified by the coordinate input pen 110, just as the infrared ray emitting section 30 emits an infrared ray necessary for the same purpose. The ultrasonic wave oscillating section 40 has a cylindrical shape and a hollow and penetrated structure. The ultrasonic wave oscillating section 40 is disposed in the pen frame 10 so as to be slidable in a lengthwise direction of the pen frame 10. Further, the ultrasonic wave element 40a for oscillating an ultrasonic wave is provided in the ultrasonic wave oscillating section 40.

The ultrasonic wave element 40a has substantially a cylindrical shape or roundel shape and is fixed in the ultrasonic wave oscillating section 40 so that the central axis in the long side direction of the pen frame 10 is identical with the central axis of the circle of the cylinder or the roundel. The ultrasonic wave oscillating section 40 is driven by a later-mentioned ultrasonic wave oscillating element driving section 60i so as to oscillate an ultrasonic wave having a constant output level (sonic velocity V (approximately 364 m/s at 20° C.)) in a direction of the ultrasonic wave emitting outlet 20d.

Further, the ultrasonic wave oscillating section 40 has a cylindrical structure, so that a space between the ultrasonic wave element 40a and the infrared ray emitting section 30 is hollow.

As described above, in the pen end section 20, the pen core 20c, the ultrasonic wave propagation route forming section 20b, the infrared ray emitting section 30, and the ultrasonic wave oscillating section 40 are combined with one another. The pen core 20c, the ultrasonic wave propagation route forming section 20b, the infrared ray emitting section 30, and the ultrasonic wave oscillating section 40 are disposed in this order so that the pen core 20c is positioned nearest to the pen point side of the coordinate input pen 110. Note that, the position of the infrared ray emitting section 30 is not limited to this. For example, the infrared ray emitting section 30 may be disposed at the back of the ultrasonic wave oscillating section 40 (at the side of the power section 70).

Further, these members are fixed with an adjacent one and combined with one another in the pen frame 10. Note that, the foregoing explains an arrangement in which the ultrasonic wave propagation route forming section 20b is attached to combination of the infrared ray emitting section 30 and the ultrasonic wave oscillating section 40, namely, the ultrasonic wave propagation route forming section 20b, the infrared ray emitting section 30, and the ultrasonic wave oscillating section 40 are combined with one another. However, the present invention is not limited to this arrangement. For example, the present invention may be arranged so that the ultrasonic wave propagation route forming section 20b is attached to the ultrasonic wave oscillating section 40 and the infrared ray emitting section 30 is attached to the inside of the ultrasonic wave propagation route forming section 20b. Namely, in the pen end section 20 according to the present embodiment, the ultrasonic wave propagation route forming section 20b is attached to the ultrasonic wave emitting section 40.

Further, a later-mentioned biasing section (coil spring) 50b is provided in the pen frame 10. In order to cause the pen end section 20 including the ultrasonic wave propagation forming section 20b and the ultrasonic wave oscillating section 40 to move in forward and backward directions within the pen frame 10 in accordance with a stroke pressure applied on the coordinate input pen 110, the coil spring 50b gives a biasing force against the stroke pressure to the pen end section 20. As a result, when the stroke pressure is not applied on the coordinate input pen 110, the pen end section 20 stands still while being pressed by the coil spring 50b to the pen point side in the pen frame 10. On the other hand, when the stroke pressure is applied on the coordinate input pen 110, the pen end section 20 moves in the frame of the coordinate input pen 110 while receiving the biasing force against the stroke pressure. Namely, the pen end section 20 can move forward and backward directions within the frame of the coordinate input pen 110 according to the stroke pressure applied on the coordinate input pen 110.

As described above, the pen end section 20 having a combined structure is contained in the pen frame 10 so as not to be fixed with the pen frame 10 but to be slidable in the lengthwise direction of the pen frame 10.

The arrangement allows an ultrasonic wave oscillated by the ultrasonic wave element 40a of the ultrasonic wave oscillating section 40 to be serially propagated to the inside of the cylindrical frame of the ultrasonic wave oscillating section 40, to the inside of the cylindrical frame of the infrared ray emitting section 30, and to the inside of the substantially conical frame of the ultrasonic wave propagation route forming section 20b and reaches the ultrasonic wave emitting orifice 20d. Then, the ultrasonic wave is emitted from the ultrasonic wave emitting outlet 20d in 360-degree directions. Namely, the arrangement allows a space through which the ultrasonic wave is propagated, namely, an ultrasonic wave propagation route from the ultrasonic wave element 40a to the ultrasonic wave emitting outlet 20d to have a constant shape. Namely, the arrangement allows the distance between the ultrasonic wave element 40a and the ultrasonic wave emitting orifice 20d to be constant.

As described above, the output level of the ultrasonic wave emitted from the ultrasonic wave element 40a is constant. Therefore, when the distance between the ultrasonic wave element 40a and the ultrasonic wave emitting orifice 20d is constant, the output level of the ultrasonic wave emitted from the ultrasonic wave emitting orifice 20d is constant.

Therefore, in a case where the user specifies any coordinates by use of the coordinate input pen 110, when a stroke pressure is applied on the coordinate input pen 110, the distance between the ultrasonic wave element 40a and the ultrasonic wave emitting outlet 20d does not change, so that it is possible to emit an ultrasonic wave of a constant output level from the ultrasonic wave emitting outlet 20d. It is therefore possible to maintain the output level of the ultrasonic wave oscillated by the coordinate input pen 110 constant.

Further, the pen core 20c and the ultrasonic wave propagation route forming section 20b are fixed with each other. Therefore, when the user applies a stroke pressure on the coordinate input pen 110, the pen core 20c and the ultrasonic wave propagation route forming section 20b move in the inside of the pen frame 10 so that the pen core 20c and the ultrasonic wave propagation route forming section 20b are combined with each other. Therefore, the distance between the ultrasonic wave emitting outlet 20d and the pen point section 20a is constant regardless of changes in stroke pressure applied on the coordinate input pen 110.

Namely, the pen point section 20a is provided so as to be movable in forward and backward directions interlocking with the ultrasonic wave emitting outlet 20d. As a result, it is possible to maintain the distance between the pen point section 20a and the ultrasonic wave emitting outlet 20d constant regardless of how high the stroke pressure applied on the pen point section 20a is.

As described, the distance between the pen point section 20a and the ultrasonic wave emitting outlet 20d is constant. Therefore, when the user specifies any coordinates by use of the coordinate input pen 110, the distance between the ultrasonic wave emitting section 20d and the reception unit 150 is constant regardless of changes in the stroke pressure applied on the coordinate input pen 110. As a result, regardless of how high the stroke pressure applied on the coordinate input pen 110 is, the reception unit 150 can receive the ultrasonic wave which is oscillated by the coordinate input pen 110 and has a constant output level. In this way, the reception unit 150 can receive the ultrasonic wave having a constant output level regardless of how high the stroke pressure applied on the coordinate input pen 110 is, so that the coordinate input apparatus 100 can accurately detect the coordinate position specified by the coordinate input pen 110.

Figure 5:
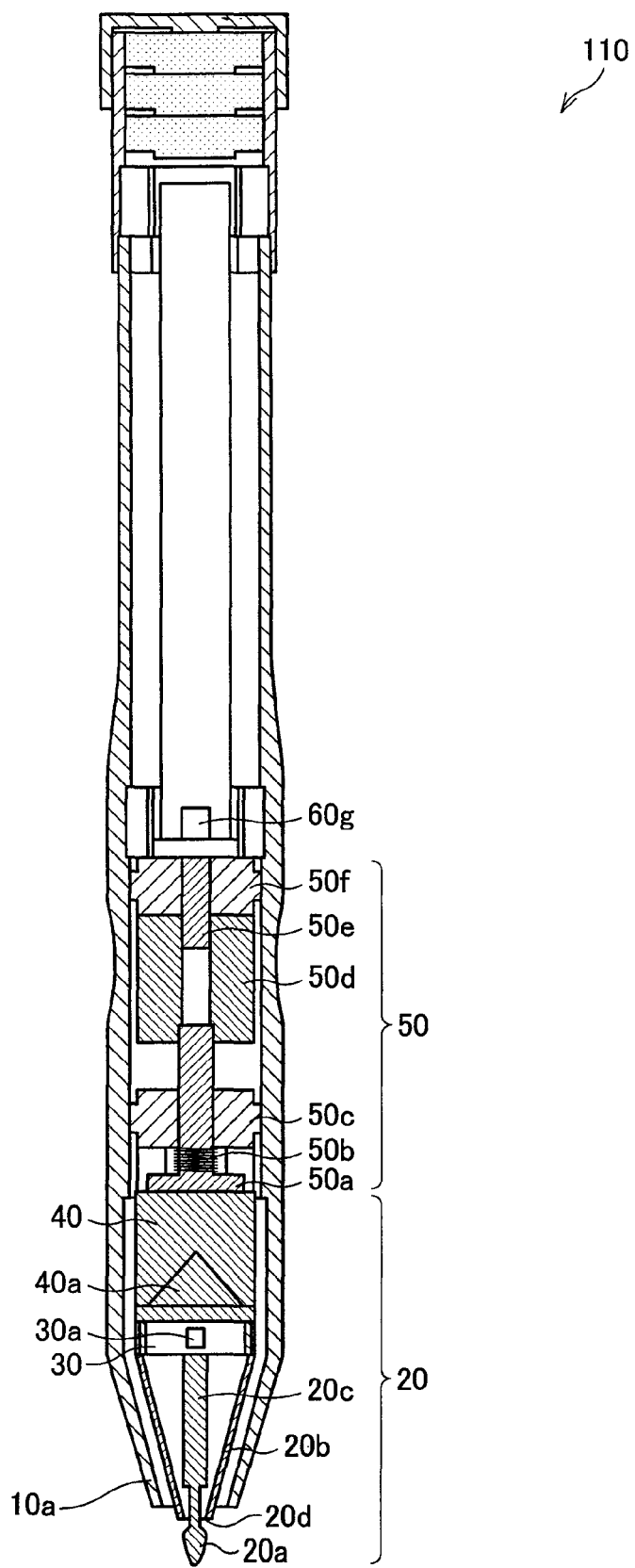
FIG. 5 is a cross sectional view illustrating an entire structure of the coordinate input pen according to the present invention at a time when a stroke pressure is applied on the pen.

Next, the following further explains the structure of the pen end section 20 with reference to FIG. 4 illustrating the entire structure of the coordinate input pen 110 and FIG. 5 illustrating the coordinate input pen 110 on which a stroke pressure is applied at a time when the user specifies any coordinates by use of the coordinate input pen 110.

As illustrated in FIG. 4, when the stroke pressure is not applied on the coordinate input pen 110, the ultrasonic wave emitting outlet 20d protrudes from the end (from the side of the pen point section 20a) of the pen point frame 10a toward the pen point section 20a. Here, both of the pen point frame 10a and the ultrasonic wave propagation route forming section 20b have a conical shape whose end is narrowed. Therefore, when the distance between the protruding ultrasonic wave emitting outlet 20d and the end of the pen point frame 10a is the maximum, namely, when the stroke pressure is not applied on the coordinate input pen 110, the ultrasonic wave propagation route forming section 20b touches the inside of the pen point frame 10a. Therefore, the ultrasonic wave propagation route forming section 20b does not move from the position toward the pen point section 20a.

As illustrated in FIG. 5, when the stroke pressure is applied on the coordinate input pen 110, the pen end section 20 moves inside of the pen frame 10 in a lengthwise direction (inner direction) of the pen frame 10. At that time, the ultrasonic wave propagation route forming section 20b is detached from the inner wall of the pen point frame 10a touched by the ultrasonic wave propagation route forming section 20b, so that a space is made between the ultrasonic wave propagation route forming section 20b and the pen point frame 10a. When a higher stroke pressure is applied on the coordinate input pen 110, the pen end section 20 moves a predetermined distance inside the pen frame 10. Note that, the predetermined distance is a distance by which the pen end section 20 can move inside the pen frame 10. FIG. 5 illustrates the coordinate input pen 110 when the pen end section 20 moves the predetermined distance inside the pen frame 10. Note that, the foregoing describes that the pen end section 20 moves inside the pen frame 10. However, when the stroke pressure is applied on the pen point section 20a, the pen point section 20a touches the input face 120 and the pen frame 10 appears to be depressed.

As illustrated in FIG. 5, when the stroke pressure is applied on the coordinate input pen 110 and the pen frame 10 is depressed by the predetermined distance, the ultrasonic wave emitting outlet 20d is not concealed by the pen frame 10, namely, the ultrasonic wave emitting outlet 20d protrudes from the pen frame 10 toward the pen point section 20a.

As described above, in the coordinate input pen 110 according to the present embodiment, in a case where the user specifies any coordinates by use of the coordinate input pen 110, the ultrasonic wave emitting outlet 20d always protrudes from the end (from the side of the pen point section 20a) of the pen point frame 10a toward the pen point section 20a regardless of how high the stroke pressure applied on the coordinate input pen 110 is. Namely, the ultrasonic wave emitting outlet 20d always protrudes from the coordinate input pen 110 to the outside. As a result, the cross sectional shape of the emitting outlet from which the ultrasonic wave is emitted is constant and the ultrasonic wave emitted from the ultrasonic wave emitting outlet 20d is not blocked by the pen frame 10.

Therefore, the ultrasonic wave emitted from the ultrasonic wave emitting outlet 20d is not blocked by the pen frame 10, so that the ultrasonic wave is emitted in 360-degree directions. Therefore, it is possible to maintain the output level of the ultrasonic wave emitted from the coordinate input pen 110 to the outside constant, regardless of how high the stroke pressure applied on the coordinate input pen 110 is. Namely, even when the user applies a different stroke pressure on the coordinate input pen 110 in inputting coordinates, it is possible to maintain the output level of the ultrasonic wave emitted from the coordinate input pen 110 constant.

Further, the foregoing arrangement allows the output level of the ultrasonic wave to be constant regardless of the change in the stroke pressure, so that it is unnecessary to change the driving voltage for driving the ultrasonic wave element 40a according to the change in the stroke pressure.

Incidentally, the coordinate values of the coordinate input pen 110 are calculated by the coordinate input apparatus 100 based on (i) the propagation period t1 in which the ultrasonic wave is propagated from the ultrasonic wave oscillator T of the coordinate input pen 110 to the ultrasonic wave receiver R1 of the reception unit 150 and (ii) the propagation period t2 in which the ultrasonic wave is propagated from the ultrasonic wave oscillator T of the coordinate input pen 110 to the ultrasonic wave receiver R2 of the reception unit 150.

In a case where the user specifies any coordinates by use of the coordinate input pen 110, when the output level of the ultrasonic wave oscillated by the coordinate input pen 110 is constant, the propagation periods t1 and t2 are constant with respect to each coordinate. The present embodiment allows the output level of the ultrasonic wave to be constant as described above, so that the propagation periods t1 and t2 corresponding to the position of the coordinate input pen 110 are constant regardless of the change in the stroke pressure applied on the coordinate input pen 110. Therefore, it is possible for the coordinate input apparatus 100 to detect coordinates with higher accuracy.

Here, based on the structures of the stroke pressure detection mechanism 50 and the driving circuit section 60, the following explains how the coordinate input pen 110 oscillates an infrared ray and an ultrasonic wave.

The stroke pressure detection mechanism 50 detects the stroke pressure applied on the coordinate input pen 110 when the user specifies any coordinates by use of the coordinate input pen 110 as described above. The stroke pressure detection mechanism 50 includes a stroke pressure transmission member 50a, the coil spring 50b, the support member 50c, a stroke pressure transmission member 50d, a bar magnet 50e, and the support member 50f. The stroke pressure transmission member 50a, the coil spring 50b, the support member 50c, the stroke pressure transmission member 50d, the bar magnet 50e, and the support member 50f are disposed in this order in the pen frame 10 so that the stroke pressure transmission member 50a is positioned nearest to the front end of the coordinate input pen 110.

The coil spring 50b can expand and contract according to the stroke pressure applied on the pen point section 20a and always gives a biasing force to the pen end section 20 in a direction of the pen point.

The stroke pressure transmission member 50a and the stroke pressure transmission member 50d are fixed with each other and the stroke pressure transmission member 50d and the bar magnet 50e are fixed with each other. The coil spring 50b whose inside is hollow and the support member 50c having a donut shape are disposed between the stroke pressure transmission member 50a and the stroke pressure transmission member 50d. The bar magnet 50e is provided with the support member 50f having the donut shape. The support members 50c and 50f are fixed with the inner wall of the pen frame 10.

As described above, the members constituting the stroke pressure detection mechanism 50 are fixed with each other except for the support members 50c and 50f, and the members are slidable inside the pen frame 10 in the long side direction of the pen frame 10 so that the members are combined with each other. Further, the stroke pressure transmission member 50a is fixed with the pen end section 20. As a result, the stroke pressure detection mechanism 50 except for the support members 50c and 50f is slidable inside the pen frame 10 in the long side direction of the pen frame 10 so that the stroke pressure detection mechanism 50 is combined with the pen end section 20.

Figure 6:
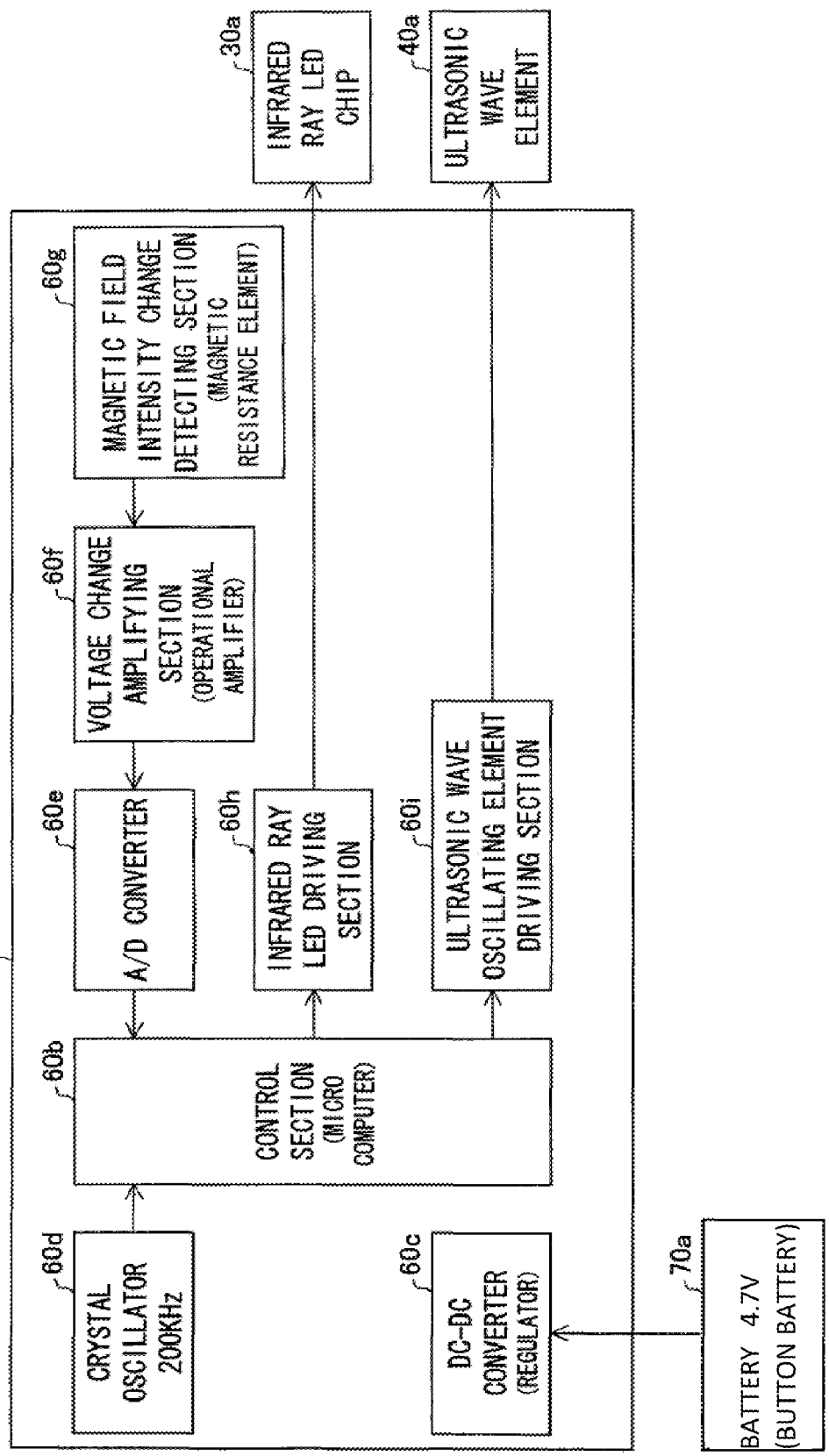
FIG. 6 is a block diagram illustrating a driving circuit section of the coordinate input pen according to the present invention.

Next, the following explains the driving circuit section 60 with reference to FIG. 6.

In accordance with changes in the distance between the bar magnet 50e of the stroke pressure detection mechanism 50 and a magnetic field intensity change detecting section (magnetic resistance element) 60g, the driving circuit section 60 amplifies and quantizes an amount of voltage variation extracted from the magnetic resistance element 60g, and when the amount of voltage variation exceeds a predetermined threshold value, the driving circuit section 60 drives the infrared ray LED chip 30a and the ultrasonic wave element 40a.

The driving circuit section 60 includes a control section 60b, a crystal oscillator 60d, a voltage change amplifying section 60f, an A/D converter 60e, an infrared ray LED driving section 60h, an ultrasonic wave oscillating element driving section 60i, and a DC-DC converter (regulator) 60c.

The control section 60b transmits a trigger signal to the infrared ray LED driving section 60h and the ultrasonic wave oscillating element driving section 60i at a predetermined interval when a value inputted from the A/D converter 60e exceeds a predetermined value.

Further, the infrared ray LED driving section 60h drives the infrared ray LED chip 30a with timing when the trigger signal is inputted from the controller 60b.

Further, the ultrasonic wave oscillating element driving section 60i drives the ultrasonic wave element 40a with timing when the trigger signal is inputted from the controller 60b. Note that, a driving voltage for driving the ultrasonic wave element 40a is set so as to have a constant value.

Here, when the user specifies an arbitrary coordinate by use of the coordinate input pen 110, namely, when the stroke pressure is applied on the coordinate input pen 110, the pen point section 20a of the pen end section 20 is pressed and the pen end section 20 and the stroke pressure detection mechanism 50 except for the support members 50c and 50f integrally move in the pen frame 10 in a direction in which the pen frame 10 is pressed, as described in FIG. 5. In this way, a pressure applied on the pen point section 20a is transmitted to the stroke pressure detection mechanism 50 via the pen end section 20.

In the stroke pressure detection mechanism 50, the stroke pressure transmission member 50a, the stroke pressure transmission member 50d, and the bar magnet 50e move in the direction in which the pen frame 10 is pressed by the distance according to the stroke pressure. Here, the stroke pressure transmission member 50a can be inserted by a predetermined distance (for example, 1 mm). The predetermined distance is equal to the distance between the stroke pressure transmission member 50d and the support member 50f without having the stroke pressure transmission member 50a inserted. Therefore, the distance between the stroke pressure transmission member 50d and the support member 50f is a distance by which the pen end section 20 can move in the pen frame 10.

As described above, the bar magnet 50e moves, so that the distance between the bar magnet 50e and the magnetic resistance element 60g in the driving circuit section 60 changes. In accordance with the change in the distance, the driving circuit section 60 is driven and accordingly the infrared ray LED driving section 60h and the ultrasonic wave oscillating element driving section 60i are driven.

The infrared ray LED driving section 60h is driven, so that a synchronization signal of an infrared ray is oscillated by the infrared ray LED chip 30a. The infrared ray penetrates the pen frame 10 and is emitted from the side of the coordinate input pen 110 in 360-degree directions.

Further, the ultrasonic wave oscillating element driving section 60i is driven, so that an ultrasonic wave at sonic velocity V (approximately 364 m/s at 20° C.) is oscillated by the ultrasonic wave element 40a toward the pen point of the coordinate input pen 110.

As described above, when the pen point section 20a of the coordinate input pen 110 touches the input face 120 and is pressed at the predetermined stroke pressure or more, the coordinate input pen 110 oscillates an infrared ray and an ultrasonic wave.

Here, the ultrasonic wave element 40a is not particularly limited as long as it can oscillate an ultrasonic wave. An example of the ultrasonic wave element 40a is a piezoelectric element made of a piezoelectric material such as a single crystal, ceramics, a thin film, macromolecule, and combinations thereof. It is preferable that the piezoelectric element is made of piezoelectric ceramics, particularly lead zirconate titanate, among the materials (the piezoelectric element is so called a PZT piezoelectric element (PZT element)). The PZT element has a high output of an ultrasonic wave with respect to an input voltage, so that it is possible to cause the input voltage to be low. Therefore, it is possible to cause a power circuit inside the pen to be small, so that it is possible to downsize the pen. Further, the PZT element is a ceramic element and accordingly has high reliability in terms of mechanism and environment protection.

Note that, OVDF element (polyvinylidene fluoride) as well as a piezoelectric element such as the PZT element is applicable to the ultrasonic wave element 40a.

Further, the foregoing explains a case where the pen end section 20 for oscillating an ultrasonic wave is provided inside the pen frame 10. However, the present invention is not particularly limited to the case. For example, the present invention may be arranged so that the pen end section 20 is exposed. Note that, in either case, the ultrasonic wave emitting orifice 20d protrudes from the pen frame 10.

As described above, the coordinate input pen according to the present invention is a coordinate input pen which includes an ultrasonic wave oscillating section for oscillating an ultrasonic wave for specifying coordinates of the coordinate input pen, the coordinate input pen having an ultrasonic wave propagation route formed so that a distance between the ultrasonic wave oscillating section and an ultrasonic wave emitting outlet for emitting the oscillated ultrasonic wave to an outside is constant.

The coordinate input pen is a pen which oscillates an ultrasonic wave so as to indicate the current position of the pen.

With the arrangement, the ultrasonic wave propagation route is formed so that the distance between the ultrasonic wave oscillating section and the ultrasonic wave emitting outlet is constant. As a result, the ultrasonic wave oscillated by the ultrasonic wave oscillating section does not change its output level while being propagated to the ultrasonic wave emitting outlet.

Namely, in a case where a user specifies any coordinates by use of the coordinate input pen, when the user presses the coordinate input pen, namely, when the user applies a stroke pressure on the coordinate input pen, the distance between the ultrasonic wave oscillating section and the ultrasonic wave emitting outlet does not change unlike conventional examples, so that it is possible for the ultrasonic wave emitting outlet to emit an ultrasonic wave having a constant output level. It is therefore possible to maintain the output level of the ultrasonic wave oscillated by the coordinate input pen constant.

Note that, the "inside" and "outside" indicate "inside" and "outside" of the frame of the coordinate input pen.

The coordinate input pen according to the present invention may be arranged so that: the ultrasonic wave propagation route includes the ultrasonic wave emitting outlet and a propagation route forming section, and the ultrasonic wave oscillating section is provided with the propagation route forming section (the propagation route forming section is fixed with the ultrasonic wave oscillating section).

With the arrangement, the ultrasonic wave propagation route includes the ultrasonic wave emitting outlet and the propagation route forming section, and the ultrasonic wave oscillating section is provided with the propagation route forming section (the propagation route forming section is fixed with the ultrasonic wave oscillating section), so that the ultrasonic wave oscillated by the ultrasonic wave oscillating section is propagated from the ultrasonic wave oscillating section via the propagation route forming section and emitted by the ultrasonic wave emitting outlet. Namely, by providing the ultrasonic wave oscillating section with the propagation route forming section (fixing the propagation route forming section with the ultrasonic wave oscillating section), it is possible to maintain the distance between the ultrasonic wave oscillating section and the ultrasonic wave emitting outlet constant.

Therefore, for example, when a stroke pressure is applied on the coordinate input pen and accordingly the relative position of the ultrasonic wave oscillating section in the coordinate input pen changes, the distance between the ultrasonic wave oscillating section and the ultrasonic wave emitting outlet does not change, so that it is possible for the ultrasonic wave emitting outlet to emit an ultrasonic wave having a constant output level. As a result, it is possible to maintain the output level of the ultrasonic wave oscillated by the coordinate input pen constant.

The foregoing arrangement may be such that: there are provided (i) a frame of the coordinate input pen and (ii) an biasing section which gives an biasing force against a stroke pressure applied on the coordinate input pen to the pen end section so that the pen end section including the ultrasonic wave propagation route and the ultrasonic wave oscillating section can be moved in forward and backward directions in the frame in accordance with the stroke pressure.

With the arrangement, the coordinate input pen includes the biasing section which gives the biasing force against the stroke pressure applied on the coordinate input pen to the pen end section so that the pen end section including the ultrasonic wave propagation route and the ultrasonic wave oscillating section can be moved in forward and backward directions in accordance with the stroke pressure. As a result, when the stroke pressure is not applied on the coordinate input pen, the pen end section stands still while being pressed by the biasing section toward the pen point. On the other hand, when the stroke pressure is applied on the coordinate input pen, the pen end section moves in the frame of the coordinate input pen in accordance with the stroke pressure applied on the coordinate input pen while receiving the biasing force against the stroke pressure.

Namely, the pen end section can move in the frame of the coordinate input pen in accordance with the stroke pressure applied on the coordinate input pen. In this way, the pen end section can move in the frame, so that the distance between the ultrasonic wave oscillating section included in the pen end section and the ultrasonic wave emitting outlet is constant regardless of how high the stroke pressure applied on the coordinate input pen is. Therefore, it is possible for the ultrasonic wave emitting outlet to emit an ultrasonic wave having a constant output level.

Further, the present invention may be arranged so that the propagation route forming section is narrowed from the ultrasonic wave oscillating section to the ultrasonic wave emitting outlet and has a hollow structure.

With the arrangement, the propagation route forming section for propagating an ultrasonic wave has a hollow structure, so that the ultrasonic wave oscillated by the ultrasonic wave oscillating section is not blocked till the ultrasonic wave reaches the ultrasonic wave emitting outlet. Therefore, it is possible to effectively emit the ultrasonic wave.

Further, the present invention may be arranged so that: there is provided a pen point section for touching the outside in inputting coordinates and the distance between the pen point section and the ultrasonic wave emitting outlet is constant.

With the arrangement, the distance between the pen point section and the ultrasonic wave emitting outlet is constant. As a result, when the user specifies any coordinates by use of the coordinate input pen, the distance between the ultrasonic wave emitting outlet and the reception section for receiving the ultrasonic wave does not change in accordance with changes in the stroke pressure applied on the coordinate input pen. Therefore, it is possible for the reception section to receive the ultrasonic wave which is oscillated by the coordinate input pen and has a constant output level, regardless of how high the stroke pressure applied on the coordinate input pen is.

Note that, to maintain the distance between the pen point section and the ultrasonic wave emitting outlet constant, the pen point section may be fixed with the ultrasonic wave oscillating section or may be fixed with the ultrasonic wave propagation route.

Further, the present invention may be arranged so that the ultrasonic wave emitting outlet is provided so as to protrude from a frame of the pen to the outside.

With the arrangement, when the user specifies any coordinates by use of the coordinate input pen, the ultrasonic wave emitting outlet is set so as to protrude from the coordinate input pen to the outside regardless of how high the stroke pressure applied on the coordinate input pen is, so that the cross sectional shape of the emitting outlet from which an ultrasonic wave is emitted is constant.

As a result, the ultrasonic wave emitted from the ultrasonic wave emitting outlet is emitted to the outside in 360-degree directions on a plane without being blocked by the frame of the pen. As a result, it is possible to maintain the output level of the ultrasonic wave oscillated by the coordinate input pen to the outside constant, regardless of how high the stroke pressure applied on the coordinate input pen is.

Further, the present invention may be arranged so that: the ultrasonic wave oscillating section moves in the frame in accordance with an operation of the user in specifying coordinates, and the ultrasonic wave emitting outlet protrudes from the frame regardless of which point of the frame the ultrasonic wave oscillating section is positioned in.

With the arrangement, the ultrasonic wave emitting outlet protrudes from the frame regardless of which point of the frame the ultrasonic wave oscillating section is positioned in, so that it is possible to emit an ultrasonic wave from the ultrasonic wave emitting outlet without being blocked by the frame. As a result, it is possible to maintain the output level of the ultrasonic wave oscillated by the coordinate input pen to the outside constant, regardless of a stroke pressure generated when the user pushes the pen point of the coordinate input pen into the main body so as to specify coordinates.

Further, the coordinate input apparatus according to the present invention includes: the coordinate input pen; the reception section for receiving an ultrasonic wave emitted by the coordinate input pen; and a calculation section for calculating coordinates of the coordinate input pen based on the ultrasonic wave received by the reception section.

With the arrangement, it is possible to maintain the output level of the ultrasonic wave oscillated by the coordinate input pen constant, regardless of the stroke pressure applied on the coordinate input pen when coordinates are inputted by use of the coordinate input pen.

Namely, the reception section can receive the ultrasonic wave whose output level is constant and the calculation section can calculates coordinates of the coordinate input pen based on the ultrasonic wave which is received by the reception section and which has a constant output level. Therefore, it is possible to accurately detect (calculate) the position specified by the user by use of the coordinate input pen. As a result, it is possible to provide the coordinate input apparatus having high accuracy in detecting coordinates.

As described above, the coordinate input pen according to the present invention can keep a constant output of an ultrasonic wave from the coordinate input pen regardless of a change in a stroke pressure, so that it is possible to enhance accuracy in detecting coordinates. Therefore, the coordinate input pen is applicable to a pen input system in which direct writing on an electric display is performed and to various kinds of input pens used in portable information terminals and the like.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A coordinate input pen arranged to generate ultrasonic waves to specify a position of the coordinate input pen, comprising:
    an ultrasonic wave generating section arranged to generate ultrasonic waves to specify a position of the coordinate input pen and to be movable within the coordinate input pen;
    an ultrasonic wave emitting outlet arranged to emit the ultrasonic waves to an exterior of the coordinate input pen; and
    an ultrasonic wave propagation route section which has a fixed length, which extends from the ultrasonic wave generating section to the ultrasonic wave emitting outlet, and which is used to propagate the ultrasonic waves to the ultrasonic wave emitting outlet.

2. The coordinate input pen as set forth in claim 1, wherein the ultrasonic wave generating section is movable in relation to the ultrasonic wave emitting outlet.

3. The coordinate input pen as set forth in claim 1, wherein:
    the ultrasonic wave propagation route section includes the ultrasonic wave emitting outlet and a propagation route forming section; and
    the propagation route forming section is fixed with the ultrasonic wave generating section.

4. The coordinate input pen as set forth in claim 1, further comprising:
    a frame for storing the coordinate input pen therein;
    a pen end section including the ultrasonic wave propagation route section and the ultrasonic wave generating section; and
    a biasing section arranged to provide a biasing force to the pen end section; wherein
    the biasing section is arranged to apply the biasing force against a stroke pressure applied to the coordinate input pen so that the pen end section moves backward and forward in the frame in accordance with the stroke pressure.

5. The coordinate input pen as set forth in claim 3, wherein the propagation route forming section narrows from the ultrasonic wave generating section to the ultrasonic wave emitting outlet and has a hollow structure.

6. The coordinate input pen as set forth in claim 1, wherein a distance between a pen point section arranged to input coordinates and the ultrasonic wave emitting outlet is constant.

7. The coordinate input pen as set forth in claim 6, wherein the pen point section is movable in forward and backward directions with the ultrasonic wave emitting outlet.

8. The coordinate input pen as set forth in claim 1, wherein the ultrasonic wave emitting outlet protrudes from a frame of the coordinate input pen.

9. The coordinate input pen as set forth in claim 1, wherein:
    the ultrasonic wave generating section is movable in forward and backward directions within a frame of the coordinate input pen; and
    the ultrasonic wave emitting outlet protrudes from the frame regardless of a position of the ultrasonic wave generating section in the frame.

10. A coordinate input pen includes:
    an ultrasonic wave generating section arranged to generate ultrasonic waves to specify coordinates of the coordinate input pen and to be movable within the coordinate input pen;
    an ultrasonic wave emitting outlet arranged to emit the ultrasonic waves to an exterior of the coordinate input pen; and
    an ultrasonic wave propagation route section arranged so that a distance between the ultrasonic wave generating section and the ultrasonic wave emitting outlet is constant.

11. A coordinate input apparatus, comprising:
    a coordinate input pen arranged to emit ultrasonic waves to specify a position of the coordinate input pen;
    a reception section arranged to receive the ultrasonic waves emitted from the coordinate input pen; and
    a calculation section arranged to calculate coordinates of the coordinate input pen based on the ultrasonic waves received by the reception section; wherein
    the coordinate input pen includes:
        an ultrasonic wave generating section arranged to generate the ultrasonic waves and to be movable within the coordinate input pen;
        an ultrasonic wave emitting outlet arranged to emit the ultrasonic waves to the exterior of the coordinate input pen; and
        an ultrasonic wave propagation route section which has a fixed length, which extends from the ultrasonic wave generating section to the ultrasonic wave emitting outlet, and which is used to propagate the ultrasonic waves to the ultrasonic wave emitting outlet.

12. The coordinate input apparatus as set forth in claim 11, wherein the ultrasonic wave generating section is movable in relation to the ultrasonic wave emitting outlet.

13. The coordinate input apparatus as set forth in claim 12, wherein a pen point section arranged to input coordinates is movable in forward and backward directions with the ultrasonic wave emitting outlet.

14. A coordinate input apparatus, comprising:
a coordinate input pen including an ultrasonic wave generating section arranged to emit ultrasonic waves to specify coordinates of the coordinate input pen and to be movable within the coordinate input pen;
a reception section arranged to receive the ultrasonic waves emitted from the coordinate input pen; and
a calculation section arranged to calculate coordinates of the coordinate input pen based on the ultrasonic waves received by the reception section; wherein
the coordinate input pen includes an ultrasonic wave emitting outlet arranged to emit the ultrasonic waves to an exterior of the coordinate input pen and includes an ultrasonic wave propagation route section arranged so that a distance between the ultrasonic wave generating section and the ultrasonic wave emitting outlet is constant.

* * * * *